United States Patent [19]
Bryan-Brown

[11] Patent Number: 5,744,351
[45] Date of Patent: Apr. 28, 1998

[54] APPARATUS FOR COMPOSITING ORGANIC WASTE

[76] Inventor: Michael Bryan-Brown, Box 17, Whitingham, Vt. 05361

[21] Appl. No.: 651,757

[22] Filed: May 22, 1996

[51] Int. Cl.$^6$ ................ C12M 1/02; C12M 1/06
[52] U.S. Cl. .................. 435/290.2; 435/290.4; 366/244; 366/255; 366/261; 366/281
[58] Field of Search ............... 435/289.1, 290.1, 435/290.2, 290.4; 71/9; 366/255, 256, 261, 281, 282, 283, 347, 345, 346, 242, 244

[56] References Cited

U.S. PATENT DOCUMENTS

| | | | |
|---|---|---|---|
| 2,736,535 | 2/1956 | Clark et al. | 366/282 |
| 3,357,812 | 12/1967 | Snell | 71/9 |
| 4,060,390 | 11/1977 | Shimizu et al. | 71/9 |
| 5,102,803 | 4/1992 | Weaver | 435/290.2 |
| 5,433,524 | 7/1995 | Wuster | 435/290.2 |
| 5,496,108 | 3/1996 | Sukup | 366/282 |

FOREIGN PATENT DOCUMENTS

| | | | |
|---|---|---|---|
| 560897 | 7/1958 | Canada | 366/287 |
| 145874 | 6/1985 | European Pat. Off. | 435/290.2 |
| 531832 | 3/1993 | European Pat. Off. | 435/290.2 |
| 238389 | 11/1978 | France | 366/281 |
| 149889 | 9/1982 | Japan | 71/9 |
| 59-190284 | 10/1984 | Japan | 435/290.2 |
| 90/00162 | 1/1990 | WIPO | 435/290.2 |

*Primary Examiner*—William H. Beisner

[57] ABSTRACT

The present invention discloses a bioreactor for aerobically composting organic waste. The bioreactor includes a container for supporting the organic waste, a rotatably positioned lid cover for enclosing the container, a mixing assembly slidably mounted to the lid cover, and an aeration system for promoting the aerobic composting process. The mixing assembly is mounted to the lid cover using a slide system which permits the mixing auger to move radially within the container. The mixing assembly includes a mixing auger and a motor for rotating the mixing auger. Preferably, the mixing auger is configured with sharp cutting edges to facilitate grinding of the composting organic waste.

17 Claims, 4 Drawing Sheets

५,७४४,३५१

APPARATUS FOR COMPOSTING ORGANIC WASTE

CROSS REFERENCE TO RELATED APPLICATION

This application is related to another U.S. patent application, Ser. No. 08/421,988 entitled "Composting Apparatus" filed on Apr. 14, 1995, now U.S. Pat. No. 5,597,732, having the same inventor, and being incorporated herein by reference.

FIELD OF THE INVENTION

This invention relates to composting apparatuses, and in particularly to composting apparatuses which are equipped with stirring assemblies.

DESCRIPTION OF THE RELATED ART

The disposal of waste has become an increasing concern of the world in the past few decades. Some current techniques for disposing garbage include landfills, incineration and ocean dumping. These techniques, however, are not favored from an environmental perspective since they may lead to serious pollution problems, such as water contamination and poor air quality. Because of these harmful environmental consequences, the world has focused on developing environmentally safe waste disposal techniques. One such environmentally safe technique for disposing waste is composting.

Composting is currently used as a method of recycling organic waste into a usable soil additive having commercial value. As such, composting has been practiced for hundreds of years. Composting involves the decomposition of organic material through the action of bacteria. Environmental concerns are addressed by the composting process, particularly when the organic material is composted under aerobic conditions. Under non-aerobic conditions, composting typically produces noxious and dangerous gases. Under aerobic conditions, thermophilic bacteria predominate thus minimizing the production of such gases produced under non-aerobic conditions.

Maintaining aerobic conditions throughout the composting organic material is an important factor in an efficient composting process. Aerobic conditions depends on the efficient passage of oxygen through the composting organic material. In light of such, prior art composting apparatuses include aeration systems and agitators to facilitate the passage of air through the composting organic material, thereby promoting the composting process. However, existing composting apparatuses are deficient for the reasons described herein.

Aeration systems are mechanisms for increasing air flow through the composting organic material. Typical aeration system designs of prior art composting apparatuses typically fail to uniformly aerate the composting organic material. These aeration system designs tend to cause certain areas of the composting organic material to be aerated more than other areas. For example, composting organic material near the aeration system and along the paths of lesser resistance, such as along the walls of the composting apparatus, will receive a greater supply of air. Accordingly, uneven temperature gradients are produced throughout the composting organic material resulting in inefficient and/or incomplete composting of the organic material.

Agitators are mechanisms for increasing the number of air passages through the composting organic material and the surface area of the composting organic material by breaking clusters of organic material into smaller clusters. Typical agitators of the prior art composting apparatuses include bladders and stirring mechanisms. Bladders agitate the organic material by action of inflation and deflation. However, the effectiveness of such agitation technique by the bladders is relatively minor compared to that of the stirring mechanisms.

Like the bladders, the effectiveness of the stirring mechanisms is also limited. Basically, the effectiveness of the stirring mechanisms depends on the size of the stirring mechanism. Small stirring mechanisms fail to provide complete agitation of all the composting organic waste. On the other hand, large stirring mechanisms which turn the entire compost mass at once require large motors and support structure.

The composting process is further promoted through the action of grinding the organic waste prior to and during composting. However, grinding requires an additional labor step and the equipment is expensive to operate. Grinding of the organic waste after it has been partially decomposed enhances the composting process because the material is softened. However, most prior art composting apparatuses do not allow for intermediate grinding part way through the composting process.

Accordingly, there exists a need for a composting apparatus that includes an aeration system which generates more uniform temperature gradients throughout the composting organic material and a mechanism which provides more effective agitation and grinding of the composting organic material with a minimum of labor.

SUMMARY OF THE INVENTION

The present invention discloses an apparatus equipped with a stirring assembly for composting organic waste. In one embodiment of the present invention, the composting apparatus comprises a container for holding organic waste, a lid cover, and a mixing assembly slidably mounted to the lid cover. The container has a center line and a top opening with a radius $r_{container}$. The container is preferably cylindrical in shape and liquid tight. The lid cover is positioned over the top opening of the container enclosing the container, and is operable to rotate about the center line of the container. The mixing assembly extends into the container and is slidably mounted to the lid cover such that the mixing assembly can move radially within the container.

Preferably, the lid cover consists an upper lid cover and a lower lid cover. The upper lid cover has a radius greater than $r_{container}$ such that the lid cover encloses the container and encompasses the top opening. The lower lid cover has a radius less than $r_{container}$ such that it may fit within the top opening of the container. The lid cover has a lid opening through which the mixing assembly can move radially and extend into the container. Further included in the bioreactor is another lid opening in the lid cover for top loading the organic waste, and a side door in the container for discharging finished compost.

The mixing assembly comprises a motor, a reduction gearbox, and a mixing auger. The motor is preferably detachably connected to the reduction gearbox, which is connected to the mixing auger. The motor provides rotational movement to the mixing auger, which mixes the organic waste being held in the container. The mixing auger is preferably configured in a manner such that it is operable to stir and lift the organic waste upward thereby fluffing the organic waste. The reduction gearbox connects the motor to the mixing auger while reducing the rotational speed of the motor to the mixing auger.

In another embodiment of the invention, the container further includes an aeration system for promoting aerobic decomposition. The aeration system comprises a top plate and enclosing side plates having perforations. The enclosing side plates are mounted to a bottom floor in the container, and the top plate is mounted upon the enclosing side plates thereby forming an aeration chamber with the bottom floor. A blower is connected to the aeration chamber for withdrawing air from the aeration chamber which, in turn, causes air to be withdrawn from the container through the perforations of the enclosing side plates. Air withdrawn from the aeration chamber is passed through a biofilter to remove odors prior to discharge to the atmosphere. The biofilter is located in a separate container and connected by ducting to the blower. Preferably, the aeration system further includes a pump connected to a pipe extending into the aeration chamber for removing liquid formed in the aeration chamber during aerobic decomposition of the organic waste.

In another embodiment of the invention, the biofilter is incorporated into the aeration system and placed at the center of the composting container. The blower assembly is positioned over the biofilter permitting the blower to draw air through the biofilter and exhaust the air through the cover and into the atmosphere.

BRIEF DESCRIPTION OF THE DRAWINGS

For a better understanding of the present invention, reference may be had to the following descriptions of exemplary embodiments thereof, considered in conjunction with the accompanying drawings, in which.

DETAILED DESCRIPTION

Figure 1:
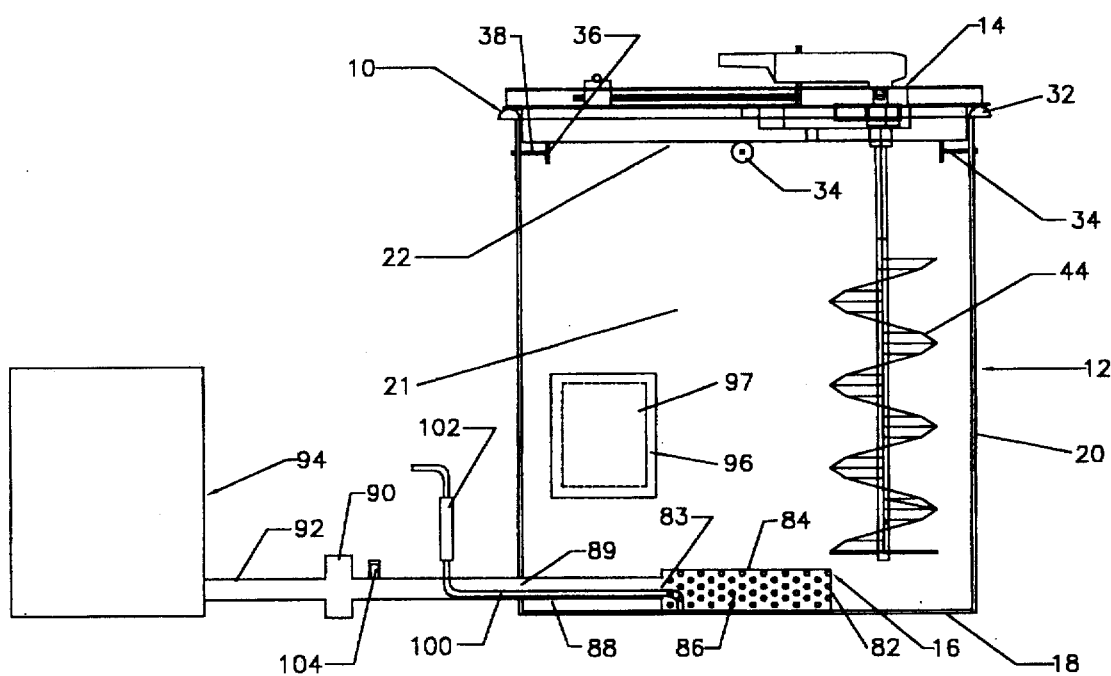
FIG. 1 depicts a sectional elevation of a bioreactor in accordance with one embodiment of the present invention.

Referring to FIG. 1, there is illustrated a sectional elevation of a composting apparatus or bioreactor 10 in accordance with one embodiment of the present invention. As shown in FIG. 1, the bioreactor 10 is designed for aerobically composting organic waste. The bioreactor 10 comprises a container 12 for supporting the organic waste, a mixing system 14 and an aeration system 16. The container 12 includes a bottom floor 18 and enclosing walls 20. The bottom floor 18 and enclosing walls preferably form a liquid tight cylindrical container 12 with a diameter $2r_{container}$, where $2r_{container}$ is preferably forty-two to one hundred inches. The container 12 has a chamber 21 wherein the organic waste is contained and a top opening 22. The enclosing walls 20 and the bottom floor 18 are constructed of a rigid and impermeable material, such as plastic, aluminum, fiberglass, etc., and preferably insulated to retain heat generated from the aerobic composting process.

Figure 2:
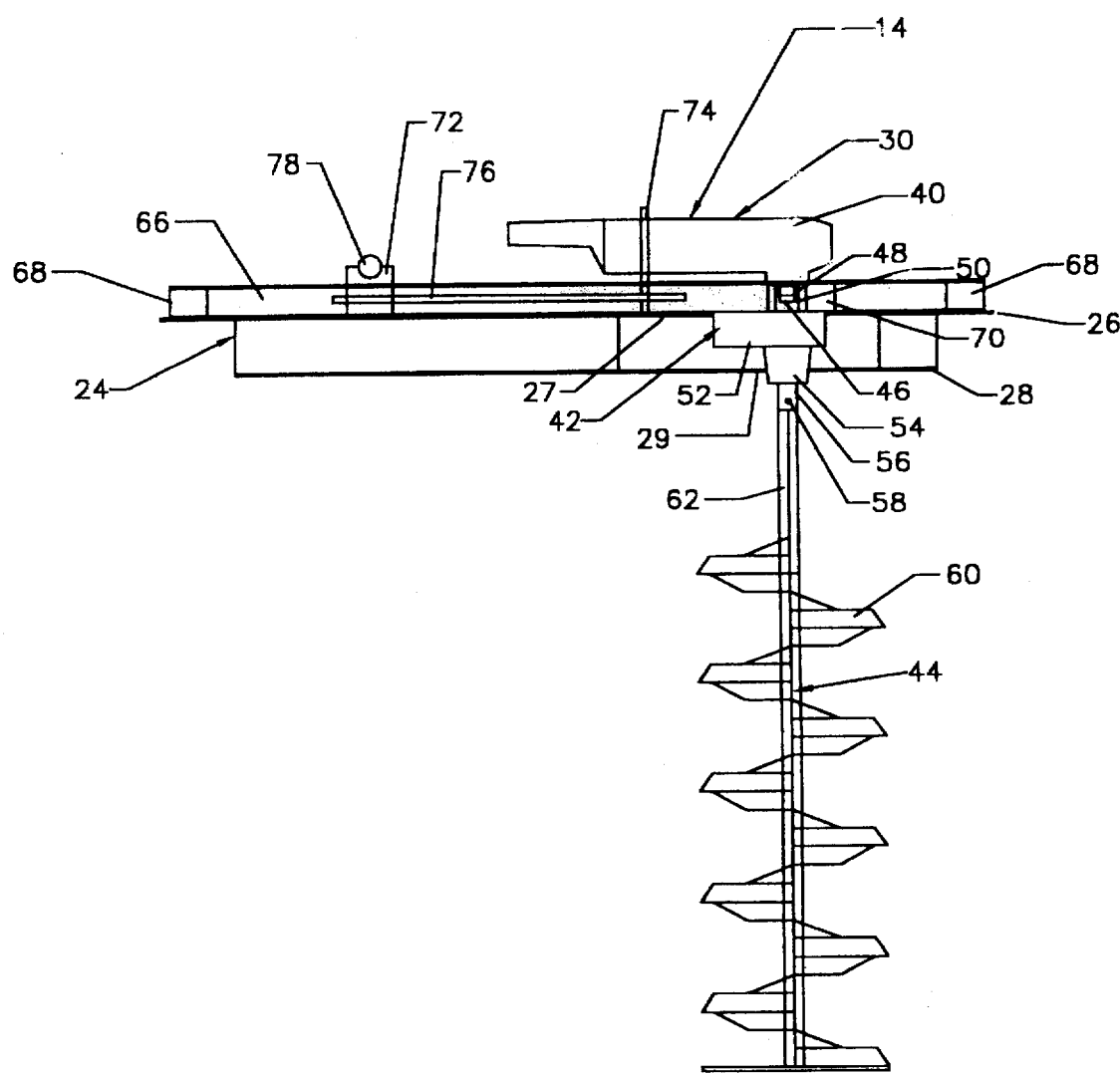
FIG. 2 depicts a sectional elevation of a mixing system 14 for stirring organic waste being held in the bioreactor of FIG. 1.
Figure 3:
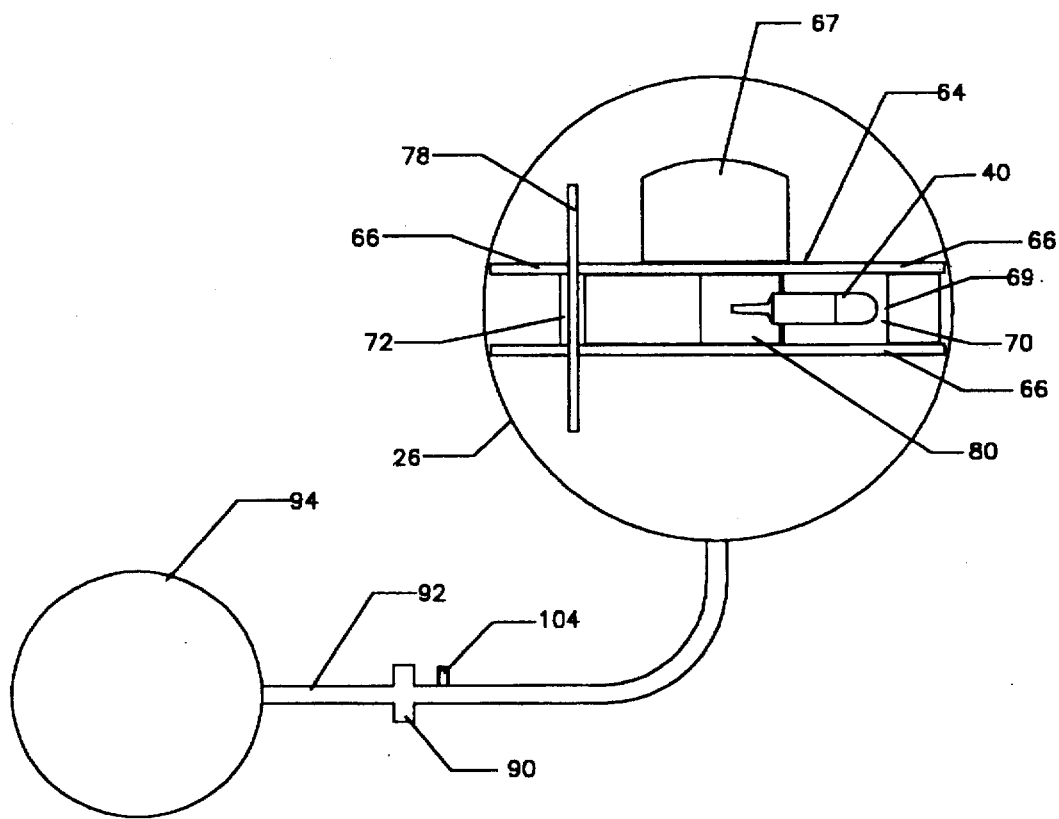
FIG. 3 depicts a plan view of the bioreactor depicted in FIG. 1.

Rotatably positioned over the top opening 22 of the container 12 is the mixing system 14. Referring to FIGS. 2 and 3, there are illustrated a sectional elevation of the mixing system 14 and a plan view of the bioreactor 10, respectively, in accordance with the embodiment of the present invention depicted in FIG. 1. As shown in FIGS. 2 and 3, the mixing system 14 comprises a lid cover 24 and a mixing assembly 30 mounted to the lid cover 24 using a slide system 64. The lid cover 24 includes an upper lid cover 26 and a lower lid cover 28. The upper lid cover 26 is preferably a disk having a radius $r_{upper-lid}$, where $r_{upper-lid} > r_{container}$ such that the upper lid cover 26 is operable to completely encompass the top opening 22 of the container 12. The lower lid cover 28 is preferably a disk having a radius $r_{lower-lid}$ and a thickness $h_{lower-lid}$, which is concentrically mounted underneath the upper lip 26, where $r_{lower-lid} < r_{container}$ such that the lower lid cover 28 is operable to fit within the top opening 22 and prevent the lid cover 24 from sliding off the container 12 when being rotated.

The upper lid cover 26 and the lower lid cover 28 have openings 27, 29, respectively, through which the mixing assembly 30 can extend into the container 12, and a loading hatch 67 for allowing access to the chamber 21 such that organic waste can be loaded. The lower lid cover 28 is preferably insulated to prevent the escape of heat generated from the aerobic composting process. The upper and lower lid covers 26, 28 are constructed of a rigid material such that the lid cover 24 is operable to structurally support the weight of the mixing assembly 30 mounted thereto.

To minimize the escape of gases and to facilitate rotational movement of the lid cover 24, the container 12 includes a lip 32 and a plurality of lid support rollers 34, as shown back in FIG. 1. The lip 32 is mounted along the top edges of the enclosing walls 20, thereby being interposed between the enclosing walls 20 and the upper lid cover 26. Preferably, the top of the lip 32 and the underside of the upper lid cover 26 are flat such that a near air tight union is formed when the lid cover 24 is positioned over the top opening 22 of the container 12, thereby minimizing the escape of aeration and/or other gases from the container 12.

The lid support rollers 34 comprise rollers 36 and shafts 38 of length $l_{shaft}$, where $l_{shaft} > r_{container} - r_{lower-lid}$ and is preferably three and one half inches. Each of the rollers 36 have a radius $r_{roller}$, which is preferably two inches, and are rotatably mounted to one end of each of the shafts 38. The other ends of each of the shafts 38 are perpendicularly mounted within the container 12 to the enclosing walls 20 at a distance $h_{lower-lid} + r_{roller}$, i.e., thickness of lower lid cover 28 plus radius of the rollers 36, from the top of the lip 32 such that the undersides of the upper lid cover 26 and the lower lid cover 28 can be positioned simultaneously on top of the lip 32 and the rollers 22, respectively. Two purposes are served by this configuration: the near air tight seal is maintained between the lip 32 and the upper lip cover 26, and rotational movement of the lid cover 24 is facilitated about the container 12 by the lid support rollers 34 while keeping the lid cover 24 centrally located over the container 12.

Note that in another embodiment of the present invention, the lid cover 24 comprises the upper lid cover 26, wherein the upper lid cover 26 has lips, not shown, mounted to the underside of the upper lid cover 26 and a radius $r_{upper-lid}$, where $r_{upper-lid} > r_{container}$ such that the lips are outside the container 12 when the lid cover 24 is positioned over the top opening 22.

Referring back to FIG. 2, the mixing assembly 30 is a mechanism for stirring and fluffing the aerobically composting organic waste in the container 12. The mixing assembly 30 comprises a motor 40, a reduction gearbox 42 and a mixing auger 44. The motor 40 has an active position and a deactive position, and includes a drive shaft 46 for rotating the mixing auger 44. In one embodiment of the present invention, the motor 40 is an electric motor with a drive power of 1,800 to 10,000 revolutions per minute (rpm).

The motor 40 further includes a nut 48 mounted around the drive shaft 46 for interconnecting the motor 40 to the reduction gearbox 42, which is a mechanism for transferring power from the motor 40 to the mixing auger 44. The reduction gearbox 42 comprises a socket drive 50, a gear assembly 52, support bearings 54 and an output shaft 56. The socket drive 50 is operable to receive the drive shaft 46 and interlock with the nut 48. The socket drive 50 is connected to the gear assembly 52 for reducing the drive power from the motor 40 as it is being transferred through the output shaft 56 to the mixing auger 44. Preferably, the drive power transferred from the motor 40 to the output shaft 56 is reduced by the gear assembly 42 to approximately 50 to 300 rpm. In a preferred embodiment of the present invention, the motor 40 is detachably connected through the nut 48 and socket drive 50 to the gear assembly 42 such that the motor may be employed by other bioreactors 10, thereby decreasing cost. Note that the support bearings 54 are interposed between the gear assembly 42 and the output shaft 56 to facilitate the power transfer.

Connected to the output shaft 56 is the mixing auger 44, which is a tool for stirring the organic waste being composted in the container 12. The mixing auger 44 comprises an auger shaft 62 and flightings 60 which are wound about the auger shaft 62. The mixing auger 44 preferably has a length $l_{auger}$, e.g. thirty two to forty eight inches, such that the mixing auger 44 is operable to reach the organic waste at the bottom of the container 12 without interfering or contacting the aeration system 16, which will be described herein. The auger shaft 62 is connected to the output shaft 56 via a locking means 58.

The flightings 60 are preferably configured clockwise around the auger shaft 62 such that the mixing auger 44 is operable to lift the composting organic waste upward from the bottom of the container 12 when the mixing auger 44 revolves clockwise. This configuration allows the mixing auger 44 to simultaneously stir and fluff the composting organic waste. Stirring and fluffing the composting organic waste increases the air passageways in the composting organic waste, thereby promoting the aerobic composting process. In another embodiment of the present invention, the flightings 60 are configured counter-clockwise to lift the composting organic waste when the mixing auger 44 revolves counter-clockwise.

Preferably, the flightings 60 are equipped with sharp cutting edges for facilitating the movement of the mixing auger 44 through the composting organic waste and for grinding/shredding the composting organic waste, thereby promoting the aerobic composting process. In another embodiment of the present invention, the flightings 60 are equipped with protruding knives, not shown, to augment the grinding/shredding action of the mixing auger 44.

Note that mixing augers 44 having clockwisely configured flightings 60 apply a downward pulling motion on lid covers 24 when the mixing auger 44 is revolving clockwise. Advantageously, this motion causes a tighter union between the upper lid cover 26 and the lip 32, which further minimizes the escape of gases from the container 12.

The mixing assembly 30 extends into the container 12 through the openings 27, 29 in the upper and lower lid covers 26, 28, and is slidably mounted to the lid cover 24 via a slide system 64, as shown in FIGS. 2 and 3. The slide system 64 and the openings 27, 29 are configured in a manner such that the mixing assembly 30 is operable to move radially from the center of the container 12 toward the enclosing walls 20.

The slide system 64 comprises guide rails 66, support blocks 68 and a control unit 69. The guide rails 66 are mounted adjacent to the support blocks 68 which are mounted to the top of the upper lid cover 26. The guide rails 66 and the support blocks 68 are configured such that the guide rails 66 are parallel to each other and equidistant from the center of the upper lid cover 26, and such that the guide rails 66 are aligned with the openings 27, 29.

The control unit 69 houses the mixing assembly 30 and is operable to slide along the guide rails 66. The control unit 69 preferably comprises a motor block 70, handle bar blocks 72, a U-shaped bracket 74, rods 76 and a handle bar 78. The motor block 70 and the U-shaped bracket 74 steadfastly holds and supports the motor 40 as the motor 40 is interlocked with the reduction gearbox 42. Specifically, the motor block 70 is mounted to the top of the gear assembly 52 and around the socket drive 50 such that the socket drive 50 is operable to receive the drive shaft 46 and interlock with the nut 48 of the motor 40. Mounted to the side of the motor block 70 is the U-shaped bracket 74, and mounted to the U-shaped bracket 74 and the motor block 70 are ends of each of the rods 76. The opposite ends of each of the rods 76 are mounted to the handle bar blocks 72 which, in turn, have mounted on top of it the handle bar 78 for allowing a worker to control the movement of the mixing assembly 30. These components collectively comprise the control unit 69 configured such that the handle bar blocks 72 and the motor block 70 are operable to slide along the guide rails 66.

In addition to providing radial movement for the mixing assembly 30, the slide system 64 also enhances the structural support of the lid cover 24. This additional structural support is particularly useful to offset the downward pulling motion of the mixing auger 44. Preferably, the support blocks 68 are mounted near the edges of the upper lid cover 26 to provide maximum support for the mixing assembly 30.

The combination of the rotatably positioned lid cover 24 and the slide system 64 permits rotational and radial movement of the mixing assembly 30 such that coverage by the mixing auger 44 is maximized—that is, the mixing auger 44 is operable to reach, mix, grind and fluff almost all of the organic waste being composted within the container 12. Coverage is not sacrificed with mixing assemblies 30 which are configured using smaller mixing augers, i.e., augers with smaller radii than the radius of the container in which they move. The smaller mixing auger mounted using the slide system 64 remains operable to reach, mix and fluff all of the organic waste being composted within the container 12. Smaller mixing augers 44 are preferred for three reasons. First, the smaller mixing augers 44 grind the organic waste better than large augers because they are continually cutting into a portion of the organic waste which is stationary. Second, the smaller augers fluff the composting organic waste better than larger mixing augers, thereby promoting the aerobic composting process. Third, smaller and lighter motors 40 can be used to drive the smaller mixing augers 44, thereby resulting in lighter mixing assemblies 30 which allow for more control and easier operation by a worker while reducing cost.

The bioreactor 10 further includes a side door 96 for discharging composted organic material and cleaning the container 12. As shown in FIG. 3, the side door 96 is mounted over an opening 97 in the enclosing walls 20.

Preferably, the opening 97 is positioned along the enclosing walls 20 at a height permitting composted organic waste to be discharged from the container 12 by the lifting motion of the mixing auger 44 and into a receiving container not shown. Note that the mixing auger 44 is operable to elevate and move the composting organic waste toward the side door 96 and to discharge the composted organic waste. For larger bioreactors 10, several side doors 96 may be included to facilitate unloading of the composted organic waste.

In a preferred embodiment of the present invention, the lid cover 24 further includes a covering 80 to enclose the openings 27, 29 preventing the unnecessary escape of aeration and/or other gases from the container 12 while permitting the mixing assembly 30 to slide back and forth within the openings 27, 29. Such covering 80 includes flaps, retractable covers, bristles, etc.

To further promote the aerobic composting process, the bioreactor 10 includes an aeration system 16. The aeration system 16 is a mechanism for increasing air flow through the composting organic material in the container 12, and comprises enclosing side plates 82 and a top plate 84. The enclosing side plates 82 are mounted along its edges to the center of the bottom floor 18. Mounted to the other edges of the enclosing side plates 82 is the top plate 84, thereby forming a chamber 86 with the bottom floor 18. The top plate 84 is preferably circular in shape with a diameter approximately one half of the diameter of the container 12, i.e., diameter of top plate 84 is $r_{container}$. In a preferred embodiment of the present invention, the enclosing side plates 82 are perforated and the top plate 84 is solid. In another embodiment of the present invention, both plates 82, 84 are perforated.

Unlike prior art aeration systems, the aeration system 16 of the present invention does not span the entire area of the bottom floor 18. The reason for this particular design is to decrease the flow of air "short-circuiting" up and/or down the enclosing walls 20—the term "short-circuiting" refers to the tendency of air to flow along the path of lesser resistance. Decreasing such air flow results in the production of more uniform aeration which, in turn, results in more uniform temperature gradients throughout the composting organic waste.

The enclosing side plates 82 has an opening 83 for allowing air to be introduced into or withdrawn from the chamber 86. One end of a duct 88 is mounted over the opening 83 such that the opening 83 is completely encompassed by the duct 88. The duct 88 is mounted to and through an opening 89 in the enclosing walls 20 and subsequently connected to a blower 90 at its other end. In a preferred embodiment of the present invention, the blower 90 has an active position and a deactive position, and is operable to withdraw air from the chamber 86 which, in turn, causes air to be withdrawn from the organic waste being held in the chamber 21 through the perforations in the enclosing side plates 82 and/or top plate 84.

Withdrawing air from the chamber 86 offers several advantages. First, uniform aeration is enhanced, thus more uniform temperature gradients can be achieved throughout the entire composting organic waste and the aerobic composting process is promoted. See related U.S. patent application Ser. No. 08/421,988 entitled "Composting Apparatus" filed on Apr. 14, 1995. Second, the escape of aeration and/or other gases from the container 12 through the openings 27, 29 in the lid cover 24 is minimized. Third, the temperature of the composting organic waste can be determined without inserting a temperature probe or sensor into the composting organic waste which would interfere with the movement of the mixing auger 44. Specifically, a temperature sensor 104 is positioned within the duct 88 to measure the temperature of the air being withdrawn from the composting organic waste. The temperature of the withdrawn air provides an indication of the temperature of the composting organic waste. Based on the measurements of the temperature sensor 104, the blower 90 is activated or deactivated to regulate the temperature of the composting organic waste. The activation and deactivation of the blower 90 may be controlled by a cycle timer when the temperature sensor is not regulating the activity of the blower 90.

Note that the air being withdrawn from the chamber 21 comprises malodorous gases. Advantageously, withdrawing such air from the chamber 21 offers operators of the bioreactor 10 the opportunity to filter the withdrawn air before releasing such air into the atmosphere. In a preferred embodiment of the present invention, the blower 90 is connected to a biofilter 94, which are well-known in the art, via a duct 92 such that the gases withdrawn from the chamber 21 can be filtered before being released into the atmosphere.

Aerobic decomposition of organic waste also results in the formation of liquid waste. The aeration system 16 further includes a pipe 100 and a pump 102 for removing such liquid waste which collected inside the bioreactor 10, or more particularly, in the chamber 21. One end of the pipe 100 extends into the chamber 21 and is positioned in a manner such that the pipe 100 is operable to reach the liquid waste in the chamber 21. The pipe 100 is connected to the pump 102 at its other end. Preferably, the pipe 100 runs through the duct 88 such that the air being withdrawn from the bioreactor 10 prevents the pipe 100 from freezing.

Figure 4:
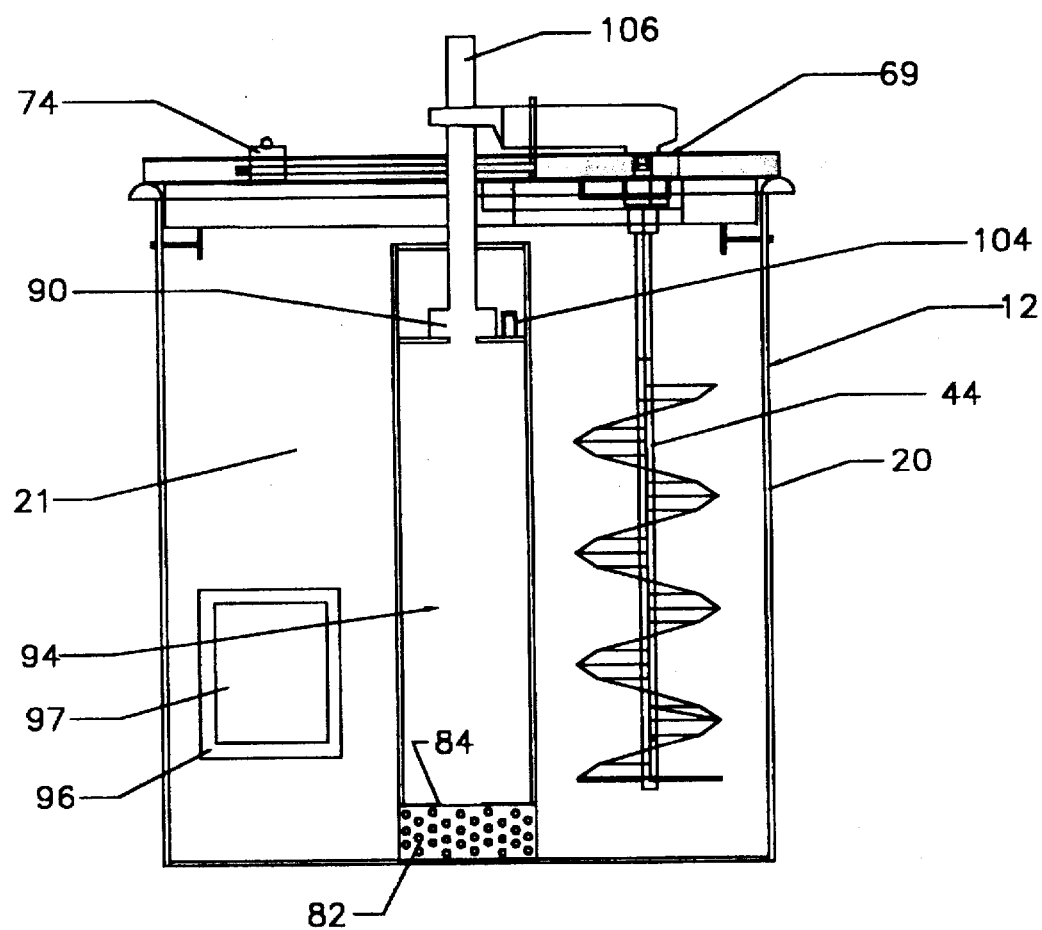
FIG. 4 depicts a sectional elevation of the bioreactor in accordance with another embodiment of the present invention.

Referring to FIG. 4, there is illustrated another embodiment of the present invention wherein the biofilter 94 is contained within the container 12. In this embodiment, the biofilter 94 is interposed between the blower 90 and the top plate 84 which has perforations through which air can pass. As shown in FIG. 4, the biofilter is positioned above and mounted to the top plate 94, and the blower is connected to the biofilter 94 and an exhaust pipe 106. The blower 90 withdraws air from the chamber 21 and into the chamber 86 through the perforations in the enclosing side plates 82. The withdrawn air then travels from the chamber 86 through the perforations in the top plate 84 and into the biofilter where the air is cleansed. The blower 90 subsequently releases the cleansed air through the exhaust pipe 106. Note that the biofilter 94, blower 90 and aeration system 16 are centrally positioned within the container 12 to avoid interference with the mixing auger 44.

Several advantages are offered by the embodiment depicted in FIG. 4. First, the bioreactor 10 is entirely self-contained. Second, no ducts are required, thus the possibility of ducts freezing are eliminated. Third, the cost per bioreactor are lowered since less equipment is required.

In operation, the bioreactor 10 is first loaded with a bulking agent, such as wood chips, preferably to approximately one half the height of the container 12, and subsequently loaded with organic waste. Note that additional organic waste may be loaded intermittently into the bioreactor 10 thereafter as the compost mix dries without requiring additional bulking agents. Air is introduced or withdrawn from the bioreactor according to the temperature of the composting organic waste or withdrawn air, as is well-known in the art. After predetermined times, the mixing system 14 is put into operation by a worker. Specifically, the worker activates the motor 40, and rotatably and radially moves the mixing assembly 30 by maneuvering the lid cover 24 and the handle bar 78.

Note that hand control operation of the mixing assembly 30 allows the worker to sense the mixing needs for different portions of the composting organic waste. For example, heavily clustered or lumped organic waste will typically impede the rotational and/or radial movement of the mixing auger 44. The worker will sense or feel the impedance and exert less force at the point of the impedance whereas a mechanically driven system would bind and cause damage to the mixing auger. The use of a worker to turn the cover also simplifies the mechanical system required for agitating the compost.

The above description is an exemplary mode of carrying out the present invention. References to specific examples and embodiments in the description should not be construed to limit the present invention in any manner, and is merely provided for the purpose of describing the general principles of the present invention. It will be apparent to one of ordinary skill in the art that the present invention may be practiced through other embodiments.

I claim:

1. A bioreactor for composting organic waste comprising:

a container for holding said organic waste, said container having a top opening and a center line;

a lid cover rotatably positioned over said top opening for enclosing said container, said lid cover operable to rotate about said center line of said container;

a mixing assembly for stirring said organic waste being held in said container; and a slide system for mounting said mixing assembly to said lid cover and enhancing structural support of said lid cover, said slide system providing radial movement for said mixing assembly in said container, said lid cover providing rotational movement of said mixing assembly in said container.

2. The bioreactor of claim 1, wherein said container has a liquid tight floor and is cylindrical in shape, said top opening having a radius $r_{container}$.

3. The bioreactor of claim 2, wherein said lid cover is a disk comprising a lower lid cover and an upper lid cover, said lower lid cover having a radius $r_{lower-lid}$ less than $r_{container}$ allowing said lower lid cover to fit within said top opening, said upper lid cover having a radius $r_{upper-lid}$ greater than $r_{container}$ such that said upper lid cover encompasses said top opening of said container.

4. The bioreactor of claim 3, wherein said container includes lid support rollers for supporting said lid cover and facilitating rotational movement of said lid cover.

5. The bioreactor of claim 4, wherein said lid support rollers are mounted to enclosing walls of said container in a manner permitting simultaneous positioning of said lower lid cover over said lid support rollers and said upper lid cover over said top opening of said container such that a near air tight seal between said container and said upper lid cover is maintain while said lid cover is being rotated about said center line.

6. The bioreactor of claim 1, wherein said mixing assembly further includes:

a mixing auger for stirring said organic waste being held in said container, said mixing auger having clockwise configured flightings operable to lift said composting organic waste and pull said lid cover downard when revolving clockwise; and a motor connected to said mixing auger for rotating said mixing auger clockwise.

7. The bioreactor of claim 6, wherein said motor is connected to said mixing auger using a reduction gearbox, said reduction gearbox operable to transfer power from said motor to said mixing auger.

8. The bioreactor of claim 7, wherein said motor includes a drive shaft and said reduction gearbox includes a socket drive for receiving said drive shaft.

9. The bioreactor of claim 6, wherein said flightings have sharp edges for shredding said organic waste in said container as said mixing auger revolves.

10. The bioreactor of claim 1, wherein said lid cover has a lid opening through which said mixing assembly can move radially within and extend into said container.

11. The bioreactor of claim 1 further comprising:

an aeration system within said container for promoting aerobic decomposition of said organic waste being held in said container, wherein said aeration system includes temperature sensors for regulating air flow.

12. An apparatus for composting organic waste comprising:

a container having a bottom floor, enclosing walls and a movable lid cover, wherein said enclosing walls are mounted about said bottom floor forming a container chamber for supporting organic waste, said lid cover rotatably mounted to said enclosing walls;

a mixing assembly slidably mounted to said lid cover for mixing said organic waste being supported by said container; and an aeration system mounted to said bottom floor within said container chamber, wherein said aeration system does not span the entire area of said bottom floor and includes enclosing side plates and a top plate, said enclosing side plates have perforations and are mounted upon said bottom floor, said top plate mounted upon said enclosing side plates forming an aeration chamber with said bottom floor.

13. The apparatus of claim 12, wherein said container further includes:

a side door mounted to said enclosing walls for discharging composted organic waste from said container using said mixing assembly.

14. The apparatus of claim 12, wherein said mixing assembly is slidably mounted to said lid cover using a slide system for providing radial movement of said mixing assembly, said slide system including a control unit for housing said mixing assembly and guide rails for radially guiding said control unit.

15. The apparatus of claim 12, wherein said apparatus further includes:

a blower means connected to said aeration system for withdrawing air from said aeration chamber and causing air to be withdrawn from said container chamber through said perforations in said enclosing side plates.

16. The apparatus of claim 12, wherein said apparatus further includes:

a biofilter connected to said blower means for cleansing said air being withdrawn from said aeration chamber by said blower means before releasing said air into atmosphere.

17. The apparatus of claim 12, wherein said aeration system further includes:

a pump connected for removing liquid formed during aerobic decomposition of said organic waste in said aeration chamber; and a pipe connected to said pump and extending into said aeration chamber such that said pump is operable to remove said liquid through said pipe.

* * * * *